(No Model.)
G. M. GUERRANT.
FRICTION LESSENING DEVICE AND BRAKE FOR PROPELLER SHAFTS.
No. 605,545. Patented June 14, 1898.
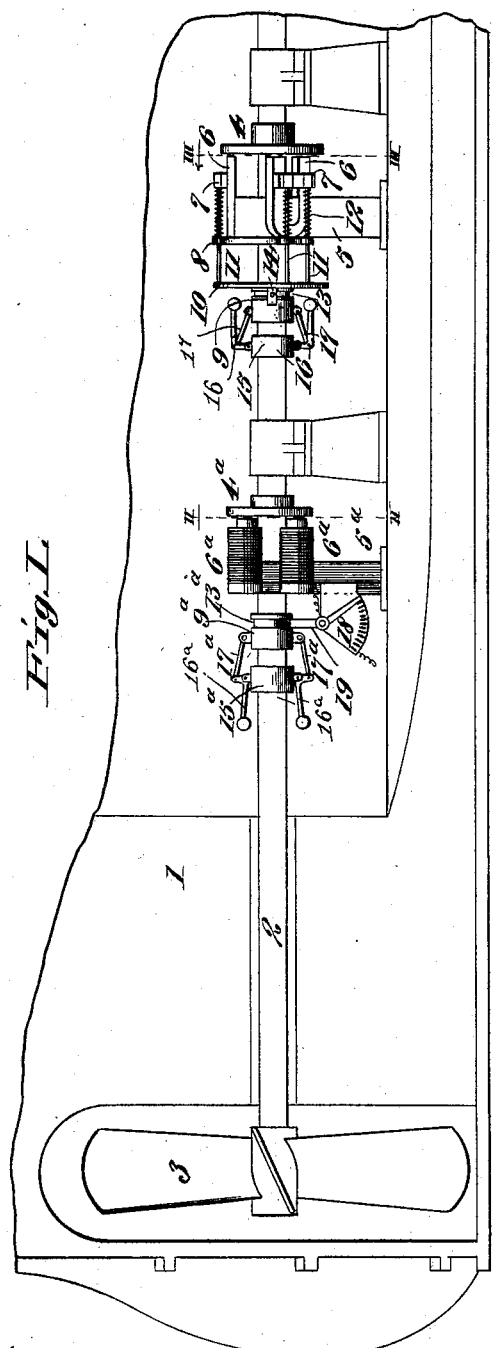
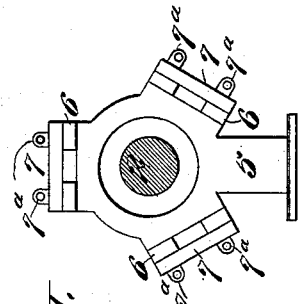
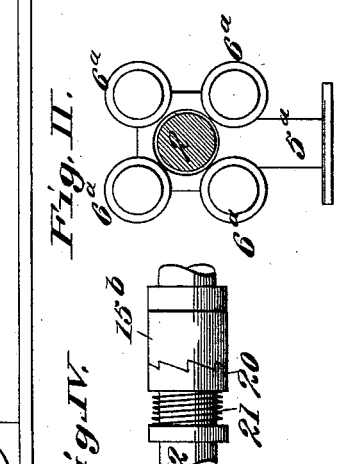
Attest:
N. Finley.
Stanley Stoner
Inventor:
George M. Guerrant.
By Knight Bros
Atty's
THE NORRIS PETERS CO., PHOTO-LITHO., WASHINGTON, D. C.

UNITED STATES PATENT OFFICE.

GEORGE M. GUERRANT, OF DANVILLE, VIRGINIA, ASSIGNOR OF TWO-THIRDS TO CHARLES O. EVANS AND JOHN M. SHEPPARD, OF ST. LOUIS, MISSOURI.

FRICTION-LESSENING DEVICE AND BRAKE FOR PROPELLER-SHAFTS.

SPECIFICATION forming part of Letters Patent No. 605,545, dated June 14, 1898.

Application filed March 3, 1897. Serial No. 625,909. (No model.)

*To all whom it may concern:*

Be it known that I, GEORGE M. GUERRANT, a citizen of the United States, residing in Danville, Pittsylvania county, State of Virginia, have invented a certain new and useful Improvement in Friction-Lessening Devices and Brakes for Propeller-Shafts, of which the following is a full, clear, and exact description, reference being had to the accompanying drawings, forming a part of this specification.

My invention relates to a device for lessening the end-thrust friction in the bearings of screw-propeller shafts of steam vessels and a brake operating upon the propeller-shaft applied by reason of the increased momentum of the shaft occasioned by the propeller-screw being thrown from the water upon the rising of the stern of the vessel in turbulent water. The friction of a screw-propeller shaft in its bearings is a very considerable item by reason of the pressure of the screw against the water to propel the vessel, causing a great amount of end thrust of the shaft. It is for the purpose of lessening this end thrust of the shaft that I have devised the construction herein set forth.

It is also the object of my invention to provide a brake through means of which the rotation of the propeller-shaft may be controlled on the propeller being thrown from the water. It is a well-known fact that the greatest percentage of breakages of screw-propeller shafts is occasioned on the turbulence of the water lifting the stern of the vessel and throwing the propeller-screw out of the water, where there is practically no restraint upon the screw compared with the restraint upon it while turning in the water, the resultant suddenly-increased momentum of the screw causing such sudden strain upon the propeller-shaft that it breaks.

My invention consists in features of novelty hereinafter fully described, and pointed out in the claims.

Referring to the drawings, Figure I shows a fragment of the stern of a vessel, the propeller, and my improvement applied to the propeller-shaft. Fig. II is an end view of a series of electromagnets with a cross-section taken through the propeller-shaft on line II II, Fig. I. Fig. III is an end view of a series of permanent magnets with a cross-section taken through the propeller-shaft on line III III, Fig. I. Fig. IV is a detail view of a controlling device for the propeller-shaft, through means of which a backward or reverse action of the propeller is permitted.

1 designates the stern of a vessel, 2 the propeller-shaft, and 3 the propeller-screw.

In the drawings I have shown the employment of both a series of permanent magnets and a series of electromagnets, as either one or the other might be effectively employed, or they might be collectively employed, the result attained being the same in either instance. I will first refer to the permanent magnet.

4 designates a disked collar fixed to the propeller-shaft 2.

5 designates a standard through which the propeller-shaft extends, and mounted upon this standard is a series of permanent magnets 6 with their poles opposed to the disked collar 4. Resting upon each of the magnets is an armature 7.

8 designates a disk rigidly attached to the standard 5.

9 designates a collar loosely mounted upon the propeller-shaft, and 10 a ring resting against said collar 9. Connected to the ring 10 are rods 11, that extend through openings in the disk 8 and are connected to the armature 7 by attachment to lugs 7ᵃ upon the armatures. Surrounding the rods 11 are coiled springs 12, that tend to project the armatures 7 in a forward direction. In the collar 9 is a groove 13, in which a pin 14, carried by the ring 10, engages.

15 designates a collar fixed to the propeller-shaft, to which are pivoted weighted arms 16, provided with link connections 17, extending to and attached to the loosely-mounted collar 9 by means of lugs thereon. This arrangement provides a governor whereby rotation of the propeller-shaft is controlled.

In operation the parts of the device remain in the position illustrated in the drawings, the armatures 7 being partially withdrawn from the ends of the poles of the magnets.

In this position the magnets exert an attraction upon the disk of the collar 4, tending to draw the collar to them, thereby acting in opposition to the end thrusts of the propeller-shaft caused by the propeller-screw 3 bearing upon the water in which it is turned. The result is that the end thrust of the shaft is greatly reduced and the friction in the shaft-bearings greatly lessened. In the event of the escape of the propeller-screw from the water the consequent increased momentum of the propeller-shaft causes the weighted arms 16 of the governor device to be thrown outward, and their movement is communicated through the links 17 to the loose collar 9, moving the collar 9 outward toward the fixed collar 15, which causes the ring 10 to likewise be carried outward and withdraw the armatures 7 to a greater distance from the ends of the poles of the magnets 6, thereby increasing the power of attraction of the magnets upon the disk of the collar 4. The result is that the disk of the collar 4 is brought into direct contact with the poles of the magnets, and the magnetic force acting upon the disk forms a brake against the momentum of the propeller-shaft. As soon as the propeller-screw returns to the water the weighted arms of the governor assume their normal position, and through the parts thereto connected the armatures of the magnets are moved to their normal position and the operation of the device proceeds as before described.

Referring now to the employment of electromagnets, 4ª designates a disked collar corresponding to the collar 4, and 6ª electromagnets with their poles opposed to the disked collar 4ª. These electromagnets are mounted upon the standard 5ª.

9ª designates a loose collar upon the shaft, provided with a groove 13ª.

15ª designates a collar fixed to the shaft, to which are pivoted weighted arms 16ª, provided with link connections 17ª to the loose collar 9ª.

18 designates a switch-plate supported on the standard 5ª, to which is pivoted a circuit-controlling arm 19, one end of which operates in the groove 13ª of the collar 9ª, while the opposite end moves over the switch-plate to control the entry of the electric current into the coils of the electromagnets 6ª.

The operation of the device in the employment of electromagnets is similar to that described in connection with the permanent magnets, with the exception that the movement of the loose collar operates the circuit-controlling arm 19 instead of operating the sliding armatures 7.

If the propeller-shaft is reversed, the end thrust is in the opposite direction, and if the governor should operate at this time it would only serve to increase the friction. To avoid thus increasing the friction, I have shown in Fig. IV a construction through means of which the governor is cut out during reverse action of the propeller-screw. In this construction the collar 15ᵇ, which carries the weighted governor-arms, is loosely mounted upon the shaft and is provided with ratchet-teeth that are engaged by the opposing teeth of a longitudinally-movable keyed collar 20, backed by a coil-spring 21. The collar 20 receives rotation from the shaft and in the forward rotation of the shaft transmits it to the collar 15ᵇ, but during the reverse rotation of the shaft the clutch-teeth slip and collar 15ᵇ remains stationary. This construction permits of the reverse action of the propeller-shaft without action of the brake. In this case the teeth of the collar 20 slip over the teeth of the collar 15ᵇ and the collar 15ᵇ remains at rest and the governor is not operated, and consequently the attractive energy of the magnets is not changed with respect to action upon the disked collars 4 or 4ª. The weighted governor-arms are so set that when the propeller is at rest the attractive force of the magnets upon the disks is shut off by the fall of the governor-arms and is not brought into use until a considerable speed in the shaft has been attained. Thus the device does not come into action until there is cause for it, owing to the end thrust of the shaft consequent upon the propulsion of the vessel.

I claim as my invention—

1. In combination with a propeller-shaft, a friction-lessening and braking device comprising a disk or collar fixed upon the shaft and magnets located adjacent to the shaft in the line of the face of said disk or collar so as to draw longitudinally thereon and in position to contact with said disk for producing a braking effect, substantially as herein explained.

2. In combination with a propeller-shaft; a magnetic counterbalance operating upon said shaft in a direction opposite to the end thrust resulting from resistance of the water to the propeller, and consisting of a suitable armature disposed circumferentially about the shaft, a similarly-disposed magnetic field in inductive relation to the side of the armature toward the propeller, and means regulated by the velocity of the shaft, for varying the effect of the magnetic field upon the armature, substantially as and for the purposes set forth.

3. In a combined end-thrust counterbalance and brake to prevent racing; the combination with a propeller-shaft, of a disk of magnetic material fixed upon said propeller-shaft, one or more magnets arranged in inductive relation to said disk on the side toward the propeller, and in such proximity to said disk as to cause contact and produce a braking effect when a strong attractive force is exerted, and means under control of the shaft for varying the degree of magnetic action of said magnet or magnets upon said disk, substantially as and for the purpose set forth.

4. In a magnetic counterbalancing device for propeller-shafts, the combination of an armature, fixed upon said shaft, magnets arranged in proximity to said armature and in position to attract the same in a direction opposite to the end thrust of the shaft, means for controlling the degree of magnetic action of said magnets, and a governor actuated by the shaft for operating said controlling means, substantially as and for the purpose set forth.

5. In a device of the character described, the combination with a propeller-shaft of a disk carried thereby, magnets arranged in proximity to said disk and having their poles opposed thereto, armatures arranged to slide upon said magnets, and a governor arranged to control the movement of said armatures, substantially as and for the purpose set forth.

6. In a device of the character described, the combination with a propeller-shaft, of a disk carried thereby, magnets arranged in proximity to said disk and having their poles opposed thereto, armatures arranged to slide upon said magnets, a loose collar on said propeller-shaft, a fixed collar on said shaft, weighted arms carried by said fixed collar, links connecting said weighted arms to said loose collar, and rods forming a connection between said loose collar and said armatures, substantially as and for the purpose set forth.

7. In combination with a propeller-shaft, an end-thrust counterbalance, a centrifugal governor whereby said counterbalance is actuated by the rotation of said propeller-shaft, and a clutch which uncouples said governor when the shaft reverses, as herein explained.

8. In combination with a propeller-shaft, an end-thrust counterbalance substantially as herein described, a centrifugal governor for actuating said counterbalance from the propeller-shaft, and a toothed clutch one member of which is loose upon the propeller-shaft and carries the centrifugal governor, and the other member of which is keyed on the propeller-shaft but longitudinally movable thereon, and is spring-pressed against the member first named, whereby the counterbalance operates only when the shaft rotates to send the vessel forward, as explained.

GEO. M. GUERRANT.

In presence of—
E. S. KNIGHT,
STANLEY STONER.